Figure 1:
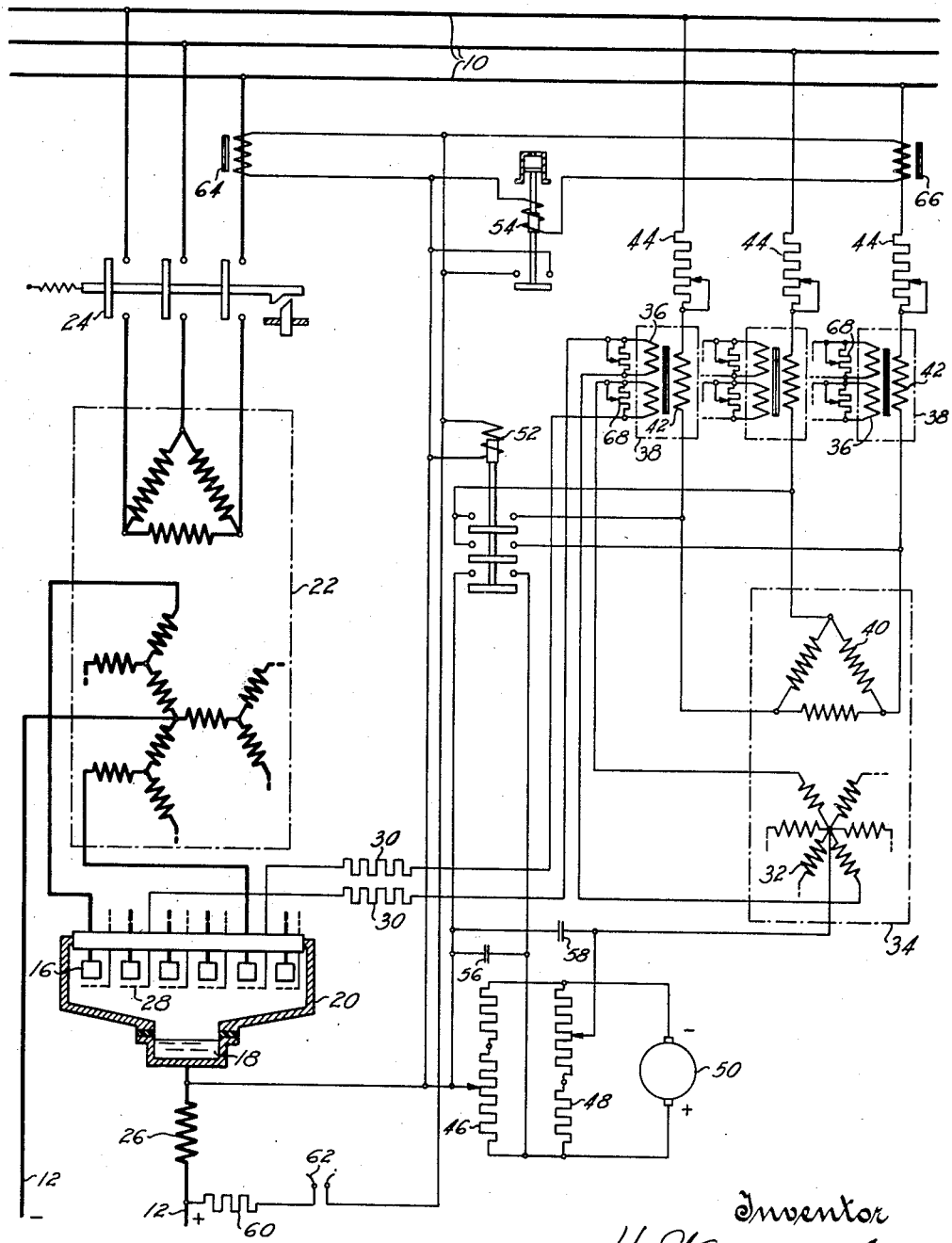

Patented Sept. 21, 1943

2,329,735

UNITED STATES PATENT OFFICE 2,329,735

ELECTRIC VALVE PROTECTIVE SYSTEM

Harold Winograd, Milwaukee, Wis., assignor to Allis-Chalmers Manufacturing Company, Milwaukee, Wis., a corporation of Delaware Application July 11, 1940, Serial No. 344,869

26 Claims. (Cl. 175—363)

This invention relates in general to improvements in protective systems and more particularly to systems for protecting electric valves, when employed to supply an inductive output circuit, against disturbances occurring in the circuits thereof.

It is well known that the flow of current from an alternating current supply circuit through electric valves to a direct current output circuit may be interrupted upon the occurrence of a disturbance by negatively energizing the control electrodes of the valves with respect to the associated cathode. In electric valves of the vapor arcing type, the flow of current through the anodes thereof is not instantly interrupted by the application of negative potential to the control electrodes thereof, but the application of negative potential to the control electrodes will prevent the transfer of the flow of current to another of the valves during the voltage cycle of the source of alternating current so that the flow of current through the valves is ultimately interrupted. In order to avoid damage to the valves and in order to avoid destruction of current consuming devices supplied by the valves by reason of a protracted flow of excessive currents therethrough, such currents should be interrupted in the shortest possible time following their initiation. If the output circuit of the valves is of an inductive character, however, the flow of current tends to continue irrespective of the action of the control electrodes until the magnetic energy stored in the inductive portions of the circuit is dissipated. Such damaging effects to the valves and current consuming devices may be avoided by so controlling the valves upon the occurrence of a disturbance as to cause such valves to operate to return, to the source, the magnetic energy stored in the inductive portions of the circuit and thereby effect a very rapid dissipation of such stored energy.

It is therefore an object of the present invention to provide an improved protective system for electric valves supplying an inductive output circuit, by which the flow of energy through the valves may be reversed upon the occurrence of a disturbance in the output circuit.

Another object of the present invention is to provide an improved protective system for electric valves supplying an inductive output circuit, by which the inductive energy stored in the output circuit is returned to the supply circuit by way of the valves upon the occurrence of a disturbance in the output circuit.

Another object of the present invention is to provide an improved protective system for electric valves having control electrodes and supplying an inductive output circuit, by which the inductive energy stored in the output circuit is caused to be returned to the supply circuit by coordinately modifying alternating and unidirectional voltage components impressed between the cathode and the control electrodes of the valves.

Another object of the present invention is to provide an improved protective system for electric valves, by which the valves are rendered non-conductive upon the occurrence of a failure of the valve action thereof.

Another object of the present invention is to provide an improved protective system for electric valves, supplying an inductive output circuit, by which the inductive energy stored in the output circuit is returned to the supply circuit upon the occurrence of a short circuit in the output circuit, and by which the valves are rendered non-conductive upon the occurrence of a failure of the valve action thereof.

Figure 2:
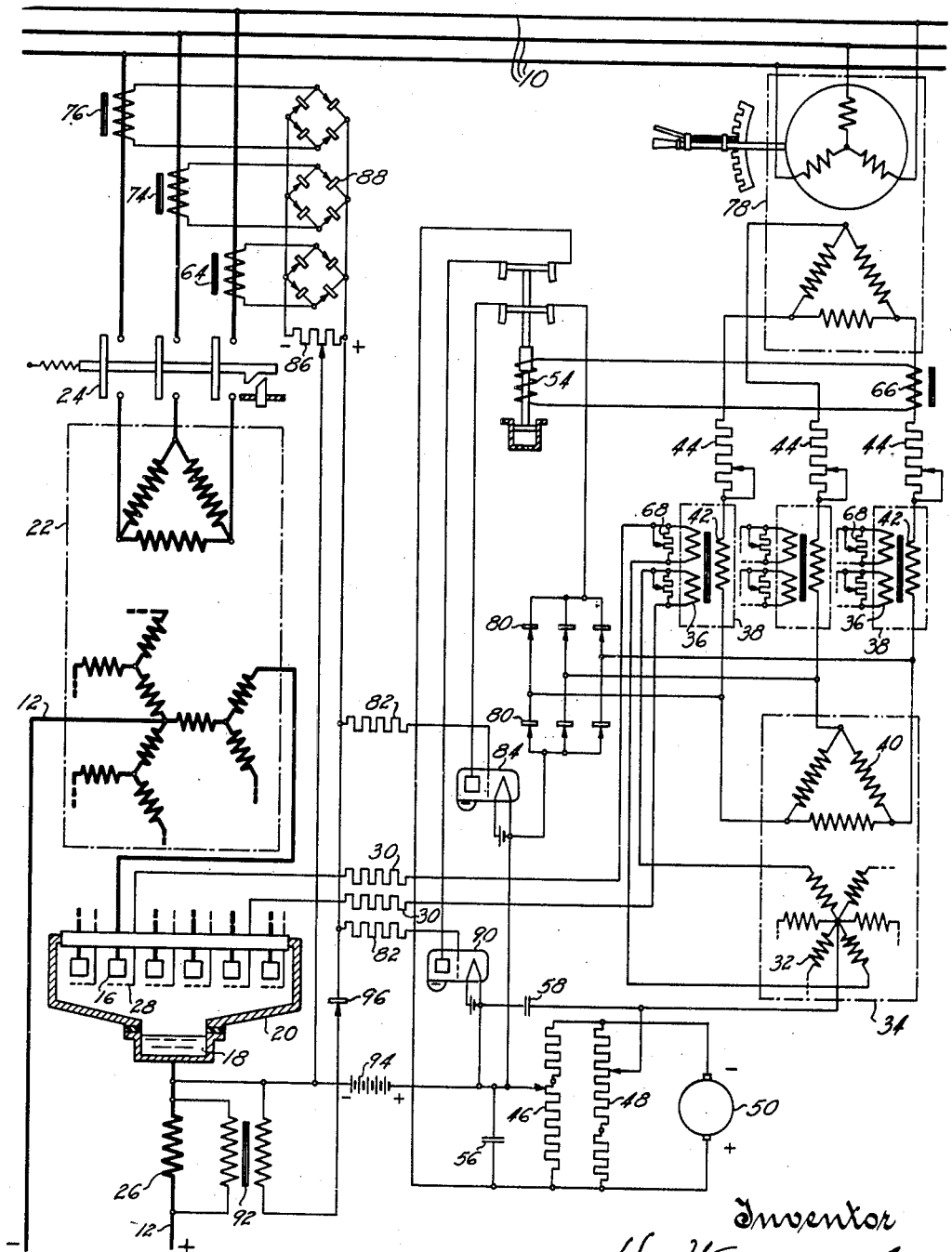
Figure 3:
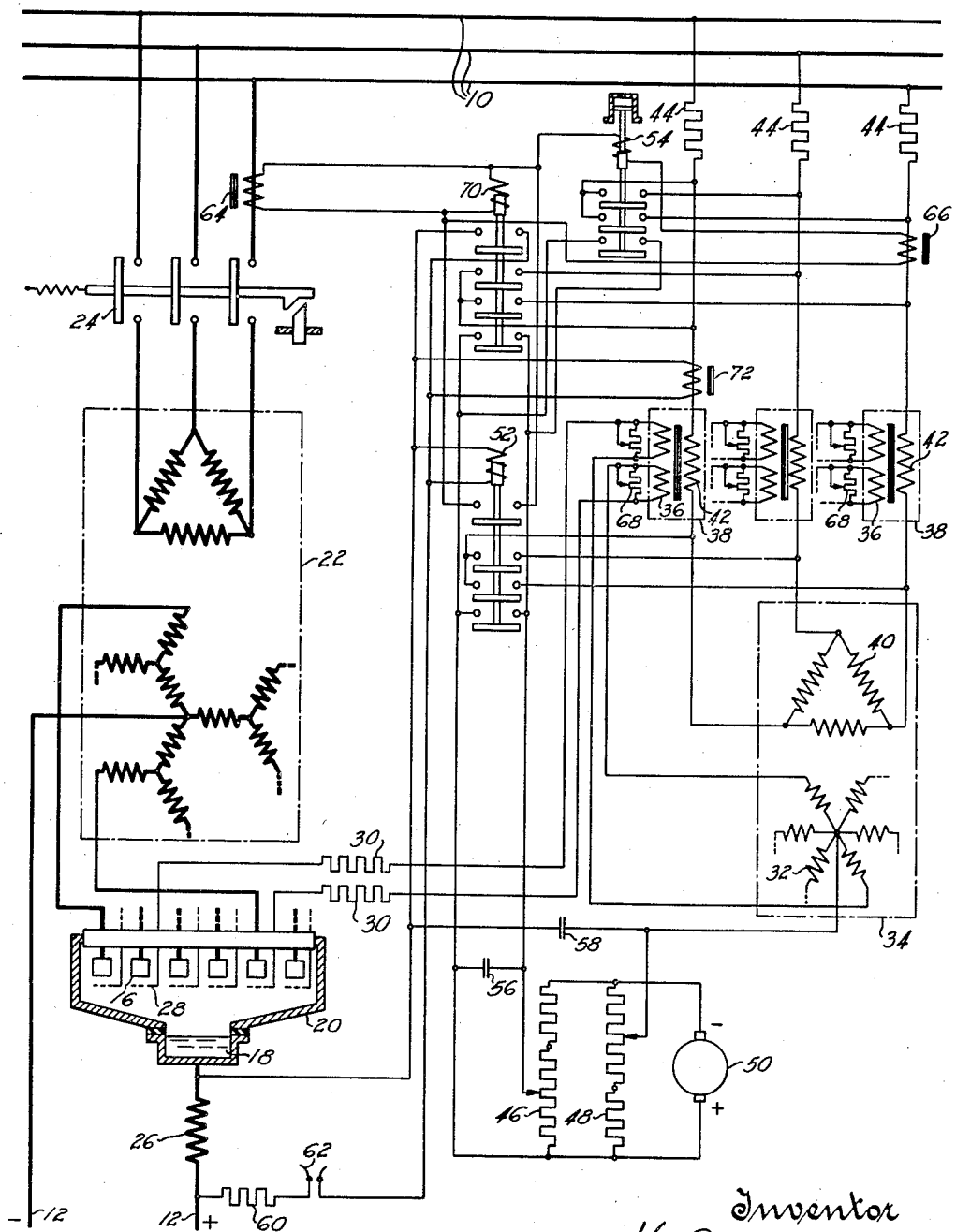
Figure 4:
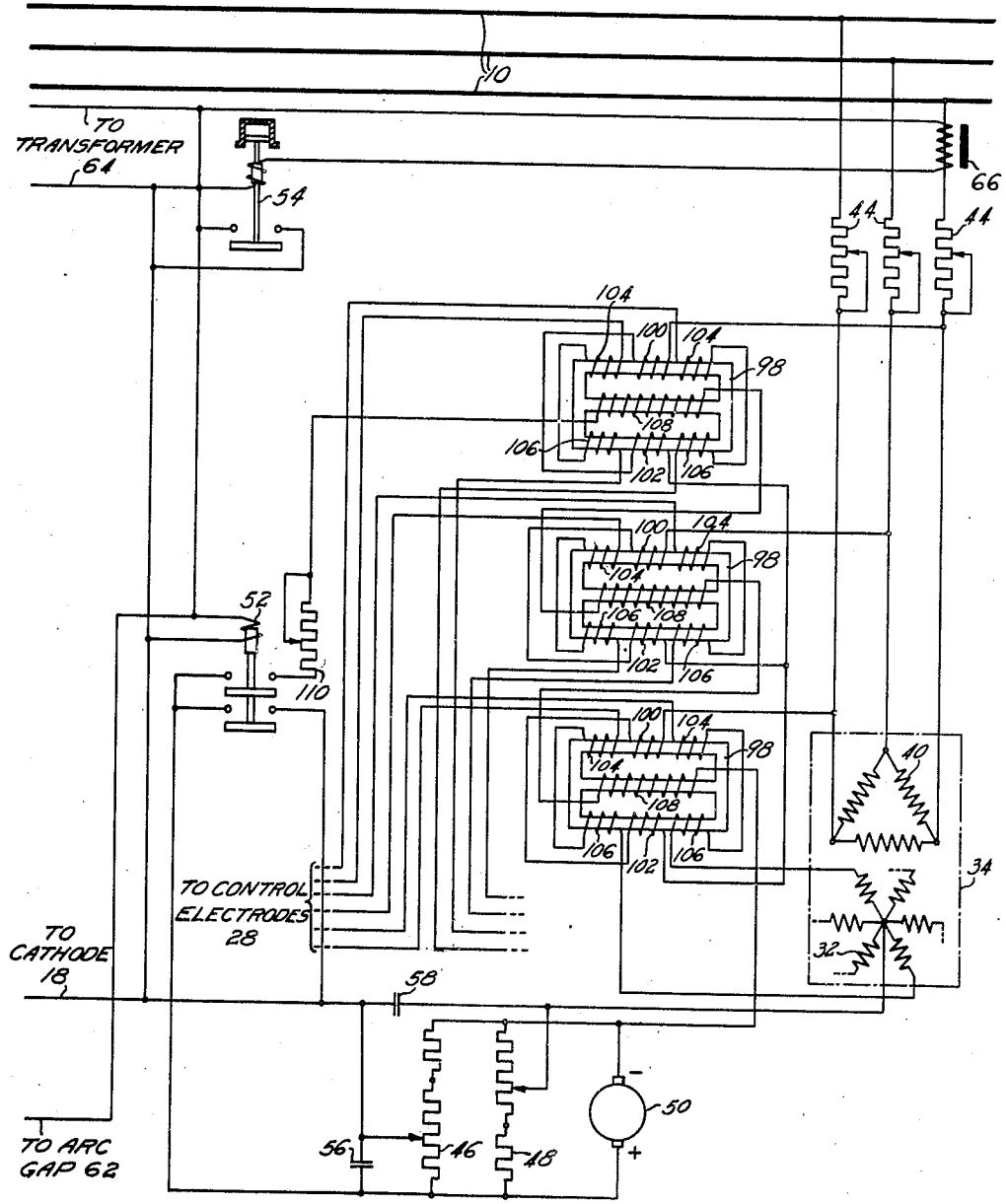

Objects and advantages other than those above set forth will be apparent from the following description when read in connection with the accompanying drawings, in which:

Fig. 1 diagrammatically illustrates one embodiment of the present invention applied to a group of electric valves utilized in an electric current converting system normally converting alternating current into direct current, and in which relays operate upon the occurrence of the flow of excessive current in the direct current circuit to modify the potentials impressed on the control electrodes of the valves in such a manner as to render the valves conductive for the discharge therethrough into the alternating current circuit of energy stored within an element of the direct current circuit, and to thereafter restore the valves to the normal operating condition thereof;

Fig. 2 diagrammatically illustrates a modified embodiment of the present invention differing from the embodiment illustrated in Fig. 1 particularly in that the circuits associated with the control electrodes of the valves are controlled by means of auxiliary electric valves and by a phase shifter;

Fig. 3 diagrammatically illustrates another modified embodiment of the present invention, differing from the embodiment illustrated in Fig. 1 particularly in the addition of a relay operable to render the valves non-conductive upon the occurrence of the failure of the valve action of any one of the valves of a nature such as to result in the flow of a reverse current therethrough; and Fig. 4 diagrammatically illustrates the modified portions of another modified embodiment of the present invention differing from the embodiment illustrated in Fig. 1 in providing modified control transformers and modified connections thereof.

Referring more particularly to Fig. 1 of the drawings by characters of reference, the reference numeral 10 designates an alternating current supply circuit, herein represented as being a three phase circuit, connected with a direct current load circuit 12 through a translating system comprising one or more electric valves. The valves may be of any type known in the art, but are preferably of the discontinuously controllable type, shown in the drawings, having anodes 16 and a common liquid cathode 18 confined within a single highly evacuated casing 20. If preferred, however, each of the valves may be provided with a separate enclosing casing and the several cathodes thereof connected in multiple to the positive conductor of the load circuit 12. The valves are provided with suitable discharge igniting and maintaining means, which are well known and therefore not shown. Each anode 16 may be connected with the circuit 10 through a single phase transformer, or as shown, through one of the phase portions of the fork connected secondary winding of a polyphase transformer 22 connected with the circuit 10, preferably through a switch 24. The two conductors of the load circuit 12 are severally connected with the cathode 18 and with the neutral point connection of the secondary winding of the transformer 22 as is well known, and the flow of current through such circuit may be rendered substantially uniform by suitable means such as the inductive reactor 26.

The flow of current through each of the valves is controlled by means of a control electrode 28 of any suitable type arranged within the path of the discharge between the anode and cathode. If the valves 16, 18 are of the discontinuously controllable type, as indicated in the drawings, the usual control electrodes serve only to control the moments of initiation of the flow of current between the anodes and the cathode. When the anodes 16 are positive with respect to the cathode 18, the flow of current therebetween is initiated when the associated control electrode reaches a potential which is more positive than the so-called critical potential, which for the purpose of explaining the present invention will be assumed to be identical with the cathode potential taken as datum, such assumption being substantially correct for the majority of valves utilized in practice.

Each control electrode 28 is connected with the cathode 18 through a control circuit connected with suitable voltage sources which impress suitable voltage components between the control electrode and the cathode to render the associated valve intermittently conductive. Each such circuit includes a current limiting resistor 30, a source of unidirectional voltage and two sources of substantially sinusoidal suitably phase displaced alternating voltages. The alternating voltage components may preferably be derived from the supply circuit 10 through suitable phase portions of the polyphase secondary winding 32 of a polyphase control transformer 34 and serially connected suitable phase portions of the secondary windings 36 of the appropriate ones of a plurality of single phase saturable control transformers 38. The primary windings 40, 42, respectively, of the transformers 34 and 38 are shown as being serially connected with the supply circuit 10 through impedance means such for instance as resistors 44. If desired, a polyphase transformer of suitable construction may, however, be employed in lieu of the plurality of single phase transformers 38, and the relative phase relations of the output voltages of the phase portions of the windings 32 and 36 may be chosen to suit particular requirements.

The unidirectional voltage component impressed on the control electrodes 28 may be obtained by the direct insertion of a voltage source therein; such voltage component may preferably, however, consist of the difference between the voltage drops in portions of two voltage dividers 46 and 48 connected in parallel across a direct current generator 50. The cathode 18 is, accordingly, connected to an adjustable tap on the voltage divider 46 and the neutral point connection of the transformer winding 32 is connected to an adjustable tap on voltage divider 48, such taps constituting the effective output terminals of the generator 50 and the voltage appearing therebetween being the effective voltage of the generator.

Associated with the converting system as described in the foregoing is a protective system comprising a comparatively fast acting overload relay 52 and a relatively slow acting resetting relay 54. The relay 52 includes contacts arranged to short circuit the primary winding 40 of the control transformer 34 and additional contacts arranged to short circuit the positive portion of the voltage divider 46, and the relay 54 includes contacts arranged to short circuit the energizing winding of the relay 52. The contacts of the relay 52 for short circuiting the positive portion of the voltage divider 46 are shunted by a capacitor 56 and the taps of the voltage dividers 46, 48 are connected with a second capacitor 58. The energizing coil of the relay 52 is connected across the terminals of the reactor 26 through a resistor 60 and an arc gap 62 and across the terminals of the secondary winding of a current transformer 64 inserted in one of the conductors connecting the supply circuit 10 to the primary winding of the supply transformer 22. The energizing coils of the relays 52, 54 are also connected in series across the terminals of the secondary winding of a current transformer 66 inserted in one of the conductors joining the supply circuit 10 to one of the resistors 44.

In operation, the supply circuit 10 being energized and the switch 24 being closed, potentials more positive than the potential of the cathode 18 are sequentially impressed on the anodes 16. The initiation of the flow of current through the respective anodes 16 will, however, occur only when the potential impressed on the associated control electrode is more positive than the critical or cathode potential and such result is intermittently effected by the impression of superimposed alternating and unidirectional voltage components between the cathode 18 and the control electrodes 28 by the transformers 34, 38 and the generator 50. The effective voltage of the generator 50 appearing between the taps of the voltage dividers 46 and 48 may be varied by moving such taps to thereby vary the point of the voltage cycle of the supply circuit 10 at which each control electrode becomes positive and thereby determines the effective value of the voltage impressed from the transformer 22 on the circuit 12 through the valves 16, 18. Such voltage may vary continuously from zero to a predetermined maximum value and may be considered as a measure of the useful conductivity of the valves 16, 18. The several valves 16, 18 are therefore rendered sequentially conductive during each cycle of the voltage of the supply circuit 10 to cause a flow of continuous current in the load circuit 12, such current being rendered substantially uniform by the action of the reactor 26.

By shifting the taps of the voltage dividers 46, 48, the unidirectional potential component of the control electrodes may be rendered positive or negative and a range of regulation of the conductivity of the valves 16, 18 obtained which is materially greater than the range obtainable with a unidirectional potential of one sign only. A valve remains non-conductive until the sum of the direct current voltage component and the momentary value of the alternating voltage components impressed on each control electrode 28 becomes equal to or more positive than the potential of the cathode 18. As the direct current voltage component is reduced from a positive value to zero and then increased to a negative value relative to the potential of the cathode 18, the point of the voltage cycle at which the control electrode changes from negative to positive to permit initiation of the flow of current through the corresponding anode is progressively retarded, thereby reducing the voltage of the load circuit 12.

During the foregoing described operation the transformers 64, 66 supply energizing current to the coils of the relays 52, 54 but of insufficient magnitude to cause their operation. Upon the occurrence of a short circuit, however, in the load circuit 12, the flow of current supplied to such circuit by the valves 16, 18 suddenly increases. A voltage impulse, accordingly, appears across the terminals of the reactor 26, of such magnitude as to cause breakdown of the spark gap 62 and cause the flow therethrough of a current surge through the energizing coil of the relay 52, of such magnitude as to cause its instant operation. Furthermore, the flow of current in the transformer 64 will increase in magnitude beyond the maximum normal value thereof and impresses on the energizing coil of the relay 52 an increasing alternating current which will reach such a magnitude as to cause operation of the relay 52 even in the absence of a sufficient impulse through the arc gap 62.

Relay 52 thereupon closes its contacts to short circuit winding 40 and the positive portion of the volage divider 46, thereby suppressing the alternating potential component supplied to each of the control electrodes 28 by the phase portions of the winding 32 and directly connecting the positive terminal of the generator 50 with the cathode 18, so that the unidirectional potential component of the control electrodes 28 is adjusted to a negative value of the required magnitude. The voltage dividers each preferably include a fixed resistance portion to thereby prevent the movement of the taps to such positions as would establish a short circuit across the generator 50.

Upon closure of the contacts of the relay 52 and the short circuiting thereby of the winding 40, an increased three phase current is drawn from the circuit 10 through the windings 42 of the respective control transformers 38 of such magnitude as to cause saturation of the cores thereof and induce in the secondary windings 36, and sequentially impress therefrom on the control electrodes 28, potential impulses of peaked wave form of such magnitude and phase relation relative to the voltage of the supply circuit 10 as to overcome the negative unidirectional potential component and render the valves conductive at such points of the voltage wave impressed on the associated anodes as to cause the discharge therethrough into the supply circuit 10 of energy stored within the reactor 26 and energy that may be stored within other elements of the load circuit 12. The rate of the discharge of energy stored within the reactor 26 is determined by the point in the cycle of the voltage wave at which the valves become conductive and may be varied by varying the taps of the resistors 44 or the taps of the resistors 68 connected across the windings 36, which operate to vary the magnitude, phase relation and the wave shape of the voltage impulses of peaked wave form.

If the phase relation between the alternating potential component impressed on the control electrodes 28 from the control transformers 38 and the potential impressed on the anodes 16 from the supply circuit 10 be so adjusted as to permit the initiation of the flow of current through the valves 16, 18, only during periods when the potential impressed on the anodes 16 from the supply circuit 10 is negative relative to the neutral point connection of the secondary winding of transformer 22, the flow of current through the valves 16, 18 will be interrupted upon completion of the discharge of energy stored within elements of the load circuit 12. If however, the phase relation between the alternating potential component impressed on the control electrodes 28 from the control transformers 38 and the potential impressed on the anodes 16 from the supply circuit 10 be so adjusted as to permit the initiation of the flow of current through the valves 16, 18 during the latter portion of the positive half-cycle of the potential wave impressed on the anodes 16 relative to the neutral point connection of the secondary winding of the supply transformer 22, then the flow of current from the supply circuit 10 through the valves 16, 18 into the load circuit 12 will be resumed at a reduced value when the energy stored within the energy storage elements of the load circuit has been discharged through the valves into the supply circuit 10. Moreover, the current flows from current transformer 66 through the energizing coils of the relays 52 and 54, thereby maintaining the armature of relay 52 attracted even after the interruption or reduction in the magnitude of the flow of current through the valves 16, 18, and also causes closure of the contacts of relay 54 after a predetermined time delay. Such closure of the contacts of the relay 54 short circuits the energizing coil of the relay 52 which releases its armature. The contacts of the relay 52 are thereby opened to remove the short circuit from across winding 40 and thereby restore the normal energization of the transformers 34 and 38, whereupon the relay 54 releases its armature to open the contacts thereof and thereby remove the short circuit from across the energizing winding of the relay 52. The opening of the contacts of relay 52 also removes the short circuit across the capacitor 56 which is then gradually charged from the generator 50 through the voltage divider 46. During such charging of the capacitor 56 the charge of the capacitor 58 also gradually varies, such gradual charging of the capacitors causing the unidirectional component impressed on the control electrodes 28 to be gradually reestablished at the initial value thereof and the transformers 34, 38 being then energized at their normal voltage, the conductivity of the valves 16, 18 is gradually restored to its initial value.

If the cause of the disturbance has then disappeared, the normal operation of the system is then automatically resumed. If, however, the cause of the disturbance is still present, then as soon as the normal operation of the system has been partially reestablished by return of the relays 52, 54 to the position shown, the flow of current through the valves 16, 18 again becomes excessive and successive operations of the relays 52, 54 will occur until disappearance of the disturbance, or until disconnection of the valves from the supply circuit by actuation of the switch 24 to the open position thereof. Such opening of the switch 24 may be effected by manual manipulation or automatically in response to a predetermined number of successive operations of the relays 52, 54 as is well known in the art.

In the embodiment of the invention illustrated in Fig. 2 of the drawings the control transformers 34 and 38, the generator 50 and the voltage dividers 46 and 48 are connected and operate, during normal operation of the system, in the manner described with respect to the embodiment of the invention illustrated in Fig. 1 of the drawings, except that a phase shifter 78 is incorporated in the connections of the supply circuit 10 to the control transformers 34, 38 by which the conductivity of the valves 16, 18 may be varied over a somewhat greater range than practical by merely shifting the taps on the resistors 44 and 68. In this embodiment of the invention, instead of short circuiting the primary winding 40 of the control transformer through the contacts of an overload relay upon the occurrence of the flow of a current of excessive magnitude in the load circuit 12, each of the conductors connecting the windings 42 to the primary winding 40 of the control transformer 34 is connected to a group of auxiliary electric valves 80 which are connected as a three phase full wave rectifier circuit. A discontinuously controllable auxiliary electric valve 84 is connected across the direct current circuit terminals of the valves 80 in series with contacts of the resetting relay 54. The current transformer 64 and additional current transformers 74, 76 are severally connected in the phases of the connections of the supply transformer 22 to the supply circuit 10, their joint output current being rectified and supplied to a voltage divider 86 through suitable groups of auxiliary electric valves 88. In this embodiment of the invention the positive portion of the voltage divider 46 is short circuited through an additional auxiliary electric valve 90 upon the occurrence of an excessive flow of current in the load circuit 12, instead of through contacts of an overload relay, as in the embodiment according to Fig. 1. Moreover, in this embodiment of the invention the resetting relay 54 receives energizing current only from the current transformer 66 inserted in one of the conductors joining the supply circuit 10 to the resistors 44. Instead of the resistor 60 and spark gap 62 for operatively energizing an overload relay as in the embodiment of the invention illustrated in Fig. 1, an impulse transformer 92 is connected across the reactor 26, having its secondary winding connected between the cathodes and control electrodes of the auxiliary valves 84 and 90 through a negative biasing potential, such as the battery 94, a current limiting resistor 82 and through an auxiliary valve 96. By reason of the negative biasing potential 94, the valves 84 and 90 are maintained non-conductive during the normal operation of the system.

As stated hereinabove, the system illustrated in Fig. 2 operates substantially as the system illustrated in Fig. 1, except that the time of release of the flow of current through the valves 16, 18 may be varied by adjustments of the phase shifter 78, instead of or in addition to adjustments of the voltage dividers 46 and 48 and adjustments of the taps of the resistors 44 and 68.

During the normal operation of the system, the output voltages of the transformer 92 and of the voltage divider 86 are insufficient to overcome the bias potential 94. The control electrodes of the valves 84 and 90 are, therefore, normally negative with respect to the associated cathodes and the valves remain continuously non-conductive. Upon the occurrence, however, of a disturbance of the order of a short circuit in the load circuit 12, the flow of current supplied to such circuit by the valves 16, 18 suddenly increases. A voltage impulse, accordingly, appears across the terminals of the reactor 26 of such magnitude as to cause a voltage to be induced in the secondary winding of the transformer 92 of magnitude sufficient to overcome the biasing potential 94 and thereby render the valves 84 and 90 conductive. Moreover, the flow of current in the transformers 64, 74 and 76 will increase in magnitude beyond the maximum normal value thereof and impress, through the valves 88 and voltage divider 86, on the control electrodes of the valves 84 and 90 a potential of such a magnitude as to overcome the biasing potential 94 and render the valves 84 and 90 conductive, even in the absence of a sufficient impulse through the transformer 92.

The valves 84 and 90 thereupon operate to substantially short circuit the winding 40 and the positive portion of the voltage divider 46, through the valves 80 and through contacts of the resetting relay 54, thereby suppressing the alternating potential component supplied to each of the control electrodes 28 by the phase portions of the winding 32 and directly connecting the positive terminal of the generator 50 to the cathode 18, so that the unidirectional potential component of the control electrodes 28 is adjusted to a negative value of the required magnitude.

As in the system illustrated in Fig. 1, upon the short circuiting of the winding 40, an increased three phase current is drawn from the supply circuit 10 through the primary windings 42 of the respective control transformers 38 of such magnitude as to cause saturation of the cores thereof and induce in the secondary windings 36, and sequentially impress therefrom on the control electrodes 28, potential impulses of peaked wave form of such magnitude and phase relative to the voltage of the supply circuit 10 as to overcome the negative unidirectional potential component, supplied from the generator 50, and render the valves 16, 18 conductive for the flow therethrough into the supply circuit 10 of energy stored within the reactor 26. Moreover, current flows from the current transformer 66 through the magnetizing coil of the resetting relay 54, which causes the opening of the contacts thereof after a predetermined time relay. Such opening of the contacts of the relay 54 interrupts the flow of current through the valve 84 to thereby remove the short circuit from across the winding 40 and thereby restore the normal energization of the transformers 34 and 38. The opening of the contacts of the relay 54 also interrupts the flow of current through the valve 90, thereby interrupting the short circuit across the positive portion of the voltage divider 46 and the short circuit across the capacitor 56, which is gradually charged, causing the unidirectional component impressed on the control electrodes 28 to be gradually reestablished at the initial value thereof and the transformers 34 and 38 being then energized at their normal voltage the conductivity of the valves 16, 18 is gradually restored to their normal operative condition.

As in the system illustrated in Fig. 1, if the cause of the disturbance has then disappeared, the normal operation of the system is then automatically resumed. If, however, the cause of the disturbance is still present, then as soon as the normal operation of the system has been partially reestablished by return of the valves 84 and 90 to the non-conductive condition, the flow of current through the valves 16, 18 will again become excessive and successive operations of the valves 84 and 90 and the relay 54 will occur until disappearance of the disturbance, or until disconnection of the valves 16, 18 from the supply circuit 10 by actuation of the switch 24 to the circuit open position thereof.

As explained in the foregoing, the systems illustrated in Figs. 1 and 2 of the drawings provide means operable upon the occurrence of the flow of current of excesive magnitude in the system for returning energy stored within elements of the load circuit 12 through the valves into the supply circuit 10. It has, however, been found desirable under certain conditions to interrupt all flow of current through the valves, and Fig. 3 of the drawings discloses a protective system having means operable to cause discharge of energy stored within elements of the load circuit 12 upon the occurrence of the flow of current of excessive magnitude therein as in the system of Fig. 1, or alternately for rendering the valves temporarily wholly non-conductive upon the occurrence of a backfire in any one of the valves 16, 18.

The elements of this system differ from the system of Fig. 1 substantially only in that in the system of Fig. 3, the relays 52, 54 and their connections have been modified and a second overload relay 70 added. In this system the control transformers 34, 38, the generator 50 and the voltage dividers 46, 48 are all connected and operate during normal operation of the system in the same manner as in the system of Fig. 1 of the drawings. The connections of the coil of relay 52 are such, however, as to be operatively energized only in response to the breakdown of the arc gap 62 responsive to the rise in the voltage across the reactor 26 upon the occurrence of the flow of current of abnormal magnitude in the load circuit 12. In this embodiment of the invention, the closure of the contacts of the relay 52 operates to establish a short circuit across the energizing coil of the relay 70 in addition to short circuiting the winding 40 of the control transformer 34. As in the system of Fig. 1 of the drawings, upon short circuiting of the winding 40, the flow of current from the supply circuit 10 through the windings 42 of the control transformers 38 is increased to such a magnitude as to saturate the cores thereof and thereby cause to be induced in the secondary windings 36 thereof and to be sequentially impressed therefrom on the control electrodes 28 potential waves of peaked wave form of such magnitude and phase relation relative to the voltage of the supply circuit 10 as to overcome the negative unidirectional component and thereby render the valves conductive for the discharge therethrough into the supply circuit 10 of energy stored within elements of the load circuit 12. Such increased flow of current through the windings 42 operates to also establish a holding circuit for the relay 52 through a current transformer 72 having a secondary winding connected across the energizing coil of the relay 52 and having its primary winding included in the connections between the supply circuit 10 and the primary winding of one of the control transformers 38 to thereby maintain the relay 52 energized until the subsequent closure of the contacts of the time delay resetting relay 54 responsive to the energization thereof through the current transformer 66, included in the connection of another one of the control transformers 38 with the supply circuit 10, and through contacts of the relay 52. The closure of the contacts of the resetting relay 54 operates to: (a) maintain the short circuit across the positive portion of the voltage divider 46, thus maintaining the positive terminal of the generator 50 in direct connection to the cathode 18, and (b) short circuit the primary windings 42 of the control transformers 38 and the primary windings of the current transformers 66 and 72, thereby preventing, temporarily, the impression of the alternating potential components on the control electrodes 28 and depriving the relays 52 and 54 of energizing current. The armatures of the relays 52 and 54 are thereupon released, their contacts opened and, if the disturbance has then disappeared, the normal operation of the system is then automatically gradually resumed. If, however, the disturbance be still present, then as soon as the normal operation of the system has been partially reestablished, the flow of current through the valves 16, 18 again becomes excessive and successive operations of the relays 52 and 54 will occur until the disappearance of the disturbance or until disconnection of the valves from the supply circuit by opening of the switch 24.

Should a backfire occur, i. e., a reverse flow of current through any one of the valves 16, 18, by reason of the loss of the valve action thereof, then the flow of current through the current transformer 64 will increase in magnitude to such an extent as to operatively energize the overload relay 70 and cause, after a time delay, operation of the resetting relay 54 through the secondary winding of the current transformer 66. The closure of the contacts of the overload relay 70 operates to: (a) short circuit the energizing winding of the overload relay 52 and thus prevent its operation; (b) short circuit the positive portion of the voltage divider 46 and thereby connect the positive terminal of the generator 50 directly to the cathode 18 and thus give a negative increment to the unidirectional potential component impressed on the control electrodes 28; (c) short circuit the primary windings 40 and 42 of the control transformers 34 and 38, respectively, and prevent thereby the induction of voltages in their secondary windings 32 and 36, and thus prevent the impression of the alternating potential components on the control electrodes; and (d) cause an increase in the magnitude of the flow of current through the current transformer 66 to such an extent as to establish a second energizing, or holding, circuit for the relay 70 and the operative energizing circuit for the resetting relay 54. As the unidirectional voltage component is then the only potential impressed on the control electrodes 28, the valves not then conducting current are immediately rendered non-conductive, and the backfiring valve becomes non-conductive when the flow of current therethrough ceases.

The closure of the contacts of the resetting relay 54 after a predetermined time delay operates to establish a second short circuit across the positive portion of the voltage divider 46 and to establish a second short circuit across the primary windings 40 and 42 of the respective control transformers 34, 36, at a point between the supply circuit and the connection thereto of the current transformer 66, which deprives the transformer 66 of current. The relays 54 and 70 thereupon release their armatures to open their contacts and thereby remove the short circuit from the positive portion of the voltage divider 46 and remove the short circuit from across the control transformers 34 and 36. The capacitor 56 is then gradually charged and the charge of the capacitor 56 is gradually varied, thus causing the unidirectional potential component impressed on the control electrodes 28 to be gradually reestablished at the initial value thereof and the transformers 34 and 36 being then energized at their normal voltage, the conductivity of the valves 16, 18 is gradually restored to its initial value, unless the backfiring condition still exists.

Should the backfiring condition still exist, then as soon as potential components impressed on the control electrodes have been partially reestablished by the return of the relays 70 and 54 to the position shown, the backfire will be reestablished and successive operations of the relays 70 and 54 will occur until the disappearance of the backfiring condition, or until disconnection of the valves from the supply circuit 10 by actuation of the switch to the circuit opening position thereof.

It will be readily comprehended by those skilled in the art that saturable transformers arranged and connected in manners other than as illustrated in Figs. 1, 2 and 3 of the drawings may be utilized in lieu of the self-saturating control transformers 36. For instance, as illustrated in Fig. 4 of the drawings, three legged core transformers 98 each having a primary winding divided into two series connected portions 100 and 102 severally arranged on the end legs of the core, a pair of secondary windings each divided into two series connected portions 104 and 106 also severally arranged on the end legs of the core, and a saturating winding 108 arranged on the center leg of the core may be utilized in lieu of the transformers 36.

As illustrated in the drawings, the primary winding portions 100 and 102 are connected in parallel with the primary winding 40 of the control transformers 34 instead of in series connection therewith. The secondary winding portions 104 and 106 are, however, severally connected in series with the phase portions of the secondary winding 32, as illustrated in Figs. 1, 2 and 3 of the drawings with respect to the connection of the windings 36, and the saturating windings 108 are illustrated as being connected in series and energized from a source of direct current, such, for instance, as the generator 50, through an adjustable resistor 110 and contacts of the overload relay 52, upon the occurrence of the closure thereof responsive to the flow of current of predetermined abnormal magnitude in the load circuit 12.

The arrangement of the elements, their connections and the operation of the system partially illustrated in Fig. 4 differs from the system illustrated in Fig. 1 substantially only in that in the system of Fig. 4 the closure of the contacts of the overload relay 52 operates to establish circuit for the flow of current from the generator 50 through the saturating windings 108 of such magnitude as to saturate the cores of the transformers 98 and thereby cause voltages of peaked wave form to be induced in the secondary winding portions 105, 106 thereof and to be impressed on the control electrodes 28 of such phase relation relative to the voltage of the supply circuit as to render the valves 16, 18 operative for the discharge therethrough into the supply circuit 10 of energy stored within elements of the load circuit 12. It will be readily comprehended that the saturation of the cores of the transformers 98 causes an increase in the magnitude of the flow of current in the primary winding portions 100 and 102 of the transformers 98. This increases the flow of current through the resistors 44 and causes an increase in the voltage drop therein, thereby reducing the voltage impressed on the primary winding 40 of the control transformer 34, which in turn causes the voltage induced in the phase portions of the secondary winding 32 to be reduced to a value ineffective for the described control purpose.

Although but a few embodiments of the invention have been illustrated and described, it will be apparent to those skilled in the art that various changes and modifications may be made therein without departing from the spirit of the invention or from the scope of the appended claims.

It is claimed and desired to secure by Letters Patent:

1. In an electric valve protective system, the combination with an electric current supply circuit, an electric current load circuit having energy storage means included therein, electric valve means interconnecting said circuits for the transfer of energy therebetween, and means for causing the transfer of energy in one direction between said circuits by way of said valve means comprising a control element of said valve means and a source of alternating potential for energizing said element, of means for causing the discharge of energy stored within said energy storage means into said supply circuit by way of said valve means comprising means responsive to the occurrence of a disturbance in the system for modifying the energization of said element.

2. In an electric valve protective system, the combination with an alternating current supply circuit, a direct current load circuit having energy storage means included therein, electric valve means interconnecting said circuits for the transfer of energy therebetween, and means for controlling the transfer of energy from said supply circuit to said load circuit by way of said valve means, of means for causing the discharge of energy stored within said energy storage means into said supply circuit by way of said valve means comprising a control element of said valve means, a source of alternating potential of peaked wave form and of predetermined phase relative to the voltage of said supply circuit connected to said element, and means operable responsive to the flow of current in said load circuit when of abnormal magnitude for temporarily rendering effective the said source of alternating potential.

3. In an electric valve protective system, the combination with an alternating current supply circuit, a direct current load circuit having energy storage means included therein, electric valve means interconnecting said circuits for the transfer of energy therebetween, and means for controlling the transfer of energy from said supply circuit to said load circuit by way of said valve means, of means for causing the discharge of energy stored within said energy storage means into said supply circuit by way of said valve means comprising a control element of said valve means, a source of alternating control potential of substantially sinusoidal wave form, means operable responsive to the flow of current in said load circuit when of abnormal magnitude to convert the said potential into a potential of peaked wave form and of a predetermined phase relative to the voltage of said supply circuit, and means for temporarily energizing said element from said potential of peaked wave form.

4. In an electric valve protective system, the combination with an alternating current supply circuit, a direct current load circuit having energy storage means included therein, electric valve means interconnecting said circuits for the transfer of energy therebetween, and means for controlling the transfer of energy from said supply circuit to said load circuit by way of said valve means, of means for causing discharge of energy stored within said storage means into said supply circuit by way of said valve means comprising a control element of said valve means, a transformer connecting said supply circuit with said element, means operable responsive to the flow of current in said load circuit when of abnormal magnitude to saturate the core of said transformer to thereby convert the output potential thereof into a potential of peaked wave form and of a predetermined phase relative to the voltage of said supply circuit, and means for temporarily energizing said element from said potential of peaked wave form.

5. In an electric valve protective system, the combination with an alternating current supply circuit, a direct current load circuit having energy storage means included therein, electric valve means interconnecting said circuits for the transfer of energy therebetween, and means for controlling the transfer of energy from said supply circuit into said load circuit by way of said valve means, of means for causing the discharge of energy stored within said energy storage means into said supply circuit by way of said valve means comprising a control element of said valve means, a transformer connecting said supply circuit with said element, means operable responsive to the flow of current in said load circuit when of abnormal magnitude to saturate the core of said transformer to thereby convert the output potential thereof into a potential of peaked wave form and of a predetermined phase relative to the voltage of said supply circuit, means for temporarily energizing said element from said potential, and time delay means operable responsive to the operation of said means operable responsive to said flow of current of abnormal magnitude to render the latter said means inoperative after a predetermined time delay.

6. In an electric valve protective system, the combination with an electric current supply circuit, an electric current load circuit having energy storage means included therein, electric valve means interconnecting said circuits for the transfer of energy therebetween, and means for controlling the transfer of energy from said supply circuit to said load circuit by way of said valve means comprising a control element of said valve means and a source of alternating control potential of one phase relative to the voltage of said supply circuit connected with said element, of means for causing the discharge of energy stored within said energy storage means by way of said valve means comprising a source of alternating control potential of a phase different from the phase of the first said control potential connected with said element, and means operable responsive to a disturbance in the system for rendering ineffective the first said control potential and for rendering effective the second said control potential.

7. The combination with an electric current supply circuit, an electric current load circuit, electric valve means interconnecting said circuits for the transfer of energy therebetween, and means for controlling the transfer of energy from said supply circuit to said load circuit by way of said valve means comprising a control element of said valve means, a source of alternating current, a transformer connecting said source of alternating current with said element for continually rendering said valve means conductive, of means for controlling the transfer of energy from said load circuit to said supply circuit by way of said valve means comprising a second transformer included in the connections between the said source of alternating current and the first said transformer and having connection with said element, and means for short circuiting a winding of the first said transformer, and for impressing a potential from the second said transformer on said element.

8. In an electric valve protective system, the combination with an alternating current supply circuit, a direct current load circuit having energy storage means included therein, electric valve means interconnecting said circuits for the transfer of energy therebetween, and means for controlling the transfer of energy from said supply circuit to said load circuit by way of said valve means comprising a control element of said valve means, a transformer connected with said supply circuit and with said element for impressing on said element a potential of predetermined phase relative to the voltage of said supply circuit, of means for causing the discharge into said supply circuit of energy stored within said energy storage means by way of said valve means comprising a second transformer connected with said supply circuit and with said element for impressing on the latter a potential of a predetermined phase different from the phase of the potential impressed on said element by the first said transformer, and means operable responsive to the flow of current of abnormal magnitude in said load circuit for rendering ineffective the first said potential and for rendering effective the second said potential.

9. The combination with an alternating current supply circuit, a direct current load circuit, electric valve means interconnecting said circuits for the transfer of energy therebetween, and means for controlling the transfer of energy from said supply circuit to said load circuit by way of said valve means comprising a control element of said valve means, a source of direct current connected with said element for continuously impressing on said element a potential of such polarity and magnitude as to render said valve means non-conductive, and a transformer connected with said supply circuit and with said element for impressing on said element an alternating potential of such predetermined phase relative to the voltage of said supply circuit as to cause said valve means to become periodically conductive, of means for controlling the transfer of energy from said load circuit to said supply circuit by way of said valve means comprising a second transformer included in the connections between said supply circuit and the first said transformer and having connection with said element for impressing on the latter an alternating potential of predetermined phase different from the phase of the potential impressed on said element by the first said transformer, and means for short circuiting a winding of the first said transformer and for rendering effective the said potential of the second said transformer.

10. The combination with an alternating current supply circuit, a direct current load circuit, electric valve means interconnecting said circuits for the transfer of energy therebetween, and means for controlling the transfer of energy from said supply circuit to said load circuit by way of said valve means comprising a control element of said valve means, a source of direct current connected with said element for impressing on the latter a negative potential relative to the potential of the cathode of said valve means and of such magnitude as to render said valve means non-conductive, and a control transformer connected with said supply circuit and with said element for impressing on the latter an alternating potential of such predetermined phase relative to the voltage of said supply circuit as to cause said valve means to become periodically conductive, of means for controlling the transfer of energy from said load circuit to said supply circuit by way of said valve means comprising a second transformer included in the connections between the said supply circuit and the first said transformer and having connection with said element for impressing on the latter an alternating potential of peaked wave form and of predetermined phase different from the phase of the potential impressed on said element by the first said transformer, and means for short circuiting the first said transformer and for rendering effective the said potential of the second said transformer.

11. The combination with an alternating current supply circuit, a direct current load circuit, electric valve means interconnecting said circuits for the transfer of energy therebetween, and means for controlling the transfer of energy from said supply circuit to said load circuit by way of said valve means comprising a control element of said valve means, a source of direct current connected with said element for impressing on the latter a potential negative relative to the potential of the cathode of said valve means and of such magnitude as to render said valve means non-conductive, and a control transformer connected with said supply circuit and with said element for impressing on the latter an alternating potential of such magnitude and of such predetermined phase relative to the voltage of said supply circuit as to render said valve means periodically conductive, of means for controlling the flow of energy from said load circuit to said supply circuit by way of said valve means comprising a second transformer included in the connections between the said supply circuit and the first said transformer and having connection with said element for impressing on the latter an alternating potential of peaked wave form and of a predetermined phase different from the phase of the potential impressed on said element from the first said transformer, and means for rendering the said potential of the first said transformer ineffective, for rendering effective the said potential of the second said transformer, and for imparting a negative increment to the potential impressed on the said element by the said source of direct current.

12. In an electric valve protective system, the combination with an alternating current supply circuit, a direct current load circuit having energy storage means included therein, electric valve means interconnecting said circuits for the transfer of energy therebetween, and means for controlling the transfer of energy from said supply circuit to said load circuit by way of said valve means comprising a control element of said valve means, a source of alternating potential connected with said element for impressing on the latter an alternating potential of such magnitude and of such phase relative to the voltage of said supply circuit as to render the said valve means periodically conductive, of means for causing the discharge of energy stored within said energy storage means into said supply circuit by way of said valve means comprising a second source of alternating potential having connection with said element for impressing on the latter an alternating potential of peaked wave form and of a predetermined phase different from the phase of the first said source of alternating potential, and means operable responsive to the flow of current in said load circuit when of abnormal magnitude for rendering ineffective the first said alternating potential and for rendering effective the second said alternating potential, and time delay means for rendering the last said means ineffective, to thereby restore the effectiveness of the first said alternating potential.

13. The combination with an alternating current supply circuit, a direct current load circuit, electric valve means interconnecting said circuits for the transfer of energy therebetween, and means for controlling the transfer of energy from said supply circuit to said load circuit by way of said valve means comprising a control element of said valve means, a source of direct current and a source of alternating potential of predetermined phase relative to the voltage of said supply circuit continuously connected with said element and jointly operable to impress on said element potentials effective to control the conductivity of said valve means, and means for varying at least one of said connections to regulate the said transfer of energy, of means for controlling the transfer of energy from said load circuit to said supply circuit by way of said valve means comprising a second source of alternating potential of peaked wave form and of a predetermined phase different from the phase of the first said source of alternating potential connected with said element, and means for rendering ineffective the first said alternating potential and for rendering effective the second said alternating potential.

14. The combination with an alternating current supply circuit, a direct current load circuit, electric valve means comprising an anode and a cathode interconnecting said circuits and constituting spaced electrodes for the transfer of energy therebetween, and means for controlling the transfer of energy from said supply circuit to said load circuit by way of said anode and cathode comprising a control electrode of said valve means, a source of direct current connected with said cathode and said control electrode for impressing on the latter a potential more negative than the potential of said cathode, and a control transformer connected with said supply circuit and with said control electrode for impressing on the latter a potential of such magnitude and phase relative to the voltage of said supply circuit as to periodically overcome the action of the first said source, of means for controlling the flow of energy from said load circuit to said supply circuit by way of said valve means comprising a control transformer included in the connections between the said supply circuit and the first said transformer and having an output winding connected with said control electrode, means comprising auxiliary electric valve means operable to short circuit the first said transformer and to saturate the core of the second said transformer to thereby convert the output potential of the second said transformer into a potential of peaked wave form and of a predetermined phase different from the phase of the output potential of the first said transformer.

15. In an electric valve protective system, the combination with an electric current supply circuit, an electric current load circuit having energy storage means included therein, electric valve means interconnecting said circuits for the transfer of energy therebetween, a control element of said valve means for controlling the transfer of energy therethrough, and means comprising a source of potential connected with said element for controlling the flow of current from said supply circuit to said load circuit by way of said valve means, of means comprising a second source of potential connected with said element for causing the discharge of energy stored within said energy storage means into said supply circuit by way of said valve means, and means operative responsive to the flow of current of abnormal magnitude in said load circuit for rendering ineffective the first said source of potential and for rendering effective the said second source of potential.

16. In an electric valve protective system, the combination with an alternating current supply circuit, an electric current load circuit having energy storage means included therein, electric valve means interconnecting said circuits for the transfer of energy therebetween, and means for causing the transfer of energy from said supply circuit to said load circuit by way of said valve means, of means for causing the discharge of energy stored within said energy storage means into said supply circuit by way of said valve means and for thereupon causing the resumption at a reduced value of the transfer of energy from said supply circuit to said load circuit by way of said valve means comprising a control element of said valve means, a source of alternating potential connected with said element, and means operable responsive to a disturbance in said system for rendering the said source of alternating potential effective.

17. In an electric valve protective system, the combination with an alternating current supply circuit, a direct current load circuit, electric valve means interconnecting said circuits for the transfer of energy therebetween, and means for controlling the transfer of energy from said supply circuit to said load circuit by way of said valve means, of means for causing the discharge of energy stored within said energy storage means into said supply circuit by way of said valve means and for thereupon causing the resumption of the transfer of energy at a reduced value from said supply circuit to said load circuit by way of said valve means comprising a control element of said valve means, a source of alternating potential connected with said element, and means operable responsive to the flow of current of abnormal magnitude in said load circuit for rendering effective the said alternating potential, and means operable after a time delay for rendering ineffective the said alternating potential.

18. In an electric valve protective system, the combination with an alternating current supply circuit, a direct current load circuit, electric valve means interconnecting said circuits for the transfer of energy therebetween, and means for controlling the transfer of energy from said supply circuit to said load circuit by way of said valve means, of means for causing the discharge of energy stored within said energy storage means into said supply circuit by way of said valve means and for thereupon causing resumption of the said transfer of energy at a reduced value from said supply circuit to said load circuit comprising a control element of said valve means, a transformer connecting said supply circuit with said element, means operable responsive to the flow of current of abnormal magnitude in said load circuit to saturate the core of said transformer to thereby convert the output voltage thereof into a voltage of peaked wave form and of predetermined phase relative to the voltage of said supply circuit, and means operable responsive to the operation of said means responsive to the flow of current of abnormal magnitude in said load circuit to render the latter said means inoperative after a predetermined time delay.

19. The combination with an alternating current supply circuit, a direct current load circuit, electric valve means interconnecting said circuits for the transfer of energy therebetween, and means for controlling the transfer of energy from said supply circuit to said load circuit by way of said valve means comprising an element of said valve means and a control transformer having a primary winding energized from said supply circuit and a secondary winding connected with said element for impressing on the latter a potential of such predetermined phase and magnitude relative to the voltage of said supply circuit as to render said valve means periodically conductive, of means for controlling the transfer of energy from said load circuit to said supply circuit by way of said valve means comprising a second control transformer having a primary winding connected in multiple with the primary winding of the first said control transformer, a secondary winding connected in series with the said secondary winding of the first said control transformer, and a saturating winding, and means for energizing said saturating winding to thereby saturate the core of the said second control transformer to thereby convert the output voltage thereof into a voltage of peaked wave form and of predetermined phase different from the phase of the output voltage of the first said control transformer and to reduce the latter voltage to a value ineffective for its intended control purpose.

20. In combination, an electric current supply circuit, an electric current load circuit, electric valve means interconnecting said circuits for transfer of energy therebetween, a control element of said valve means, two sources of alternating potential of different phases serially connected to said element cooperatively operable to impress thereon a composite alternating potential component of such phase and magnitude relative to the voltage of said supply circuit as to control the transfer of energy from said supply circuit to said load circuit by way of said valve means, and means for controlling the flow of energy from said load circuit to said supply circuit by way of said valve means comprising means operable to render ineffective one of said sources of potential and to modify the other one of said sources of potential.

21. In combination, an alternating current supply circuit, a direct current load circuit, electric valve means interconnecting said circuits for the transfer of energy therebetween, a control element of said valve means, two control transformers having primary windings energized from said supply circuit and serially connected secondary windings supplying sinusoidal potentials of different phases connected to said control element and cooperatively operable to impress thereon a composite potential component of such phase and magnitude relative to the voltage of such supply circuit as to control the transfer of energy from said supply circuit to said load circuit by way of said valve means, and means for controlling the transfer of energy from said load circuit to said supply circuit by way of said valve means comprising means operable to short circuit one of said transformers and saturate the core of the other one of said transformers to thereby convert the potential thereof into a potential of peaked wave form and of a phase different from the phase of said composite potential component.

22. In combination, an alternating current supply circuit, a direct current load circuit, electric valve means interconnecting said circuits for the transfer of energy therebetween, a control element of said valve means, two control transformers having primary windings energized from said supply circuit and serially connected secondary windings supplying sinusoidal potentials of different phases connected to said control element and cooperatively operable to impress thereon a composite potential component of such phase and magnitude relative to the voltage of such supply circuit as to control the transfer of energy from said supply circuit to said load circuit by way of said valve means, and means for controlling the transfer of energy from said load circuit to said supply circuit by way of said valve means comprising means operable to convert the composite potential of said transformers into another composite potential of a phase different from the phase of the first said composite potential component.

23. In an electric valve protective system, the combination with an electric current supply circuit, an electric current load circuit having energy storage means included therein, electric valve means interconnecting said circuits for the transfer of energy therebetween, and means for causing the transfer of energy from said supply circuit into said load circuit by way of said valve means comprising a control element of said valve means and a source of control potential for energizing said element, of means for causing the discharge of energy stored within said energy storage means into said supply circuit by way of said valve means comprising static means only for modifying the energization of said element.

24. In an electric valve protective system, the combination with an electric current supply circuit, an electric current load circuit having energy storage means included therein, electric valve means interconnecting said circuits for the transfer of energy therebetween, and means for causing the transfer of energy from said supply circuit to said load circuit by way of said valve means comprising an element of said valve means and a source of control potential connected with said element, of means for causing the discharge of energy stored within said energy storage element into said load circuit by way of said valve means, comprising a second source of control potential connected with said element, and static means only for rendering ineffective the first said control potential and for rendering effective the second said control potential.

25. In an electric valve protective system, the combination with an electric current supply circuit, an electric current load circuit having energy storage means included therein, electric valve means interconnecting said circuits for the transfer of energy therebetween, and means for controlling the transfer of energy from said supply circuit to said load circuit by way of said valve means comprising a control element of said valve means and a source of alternating control potential of one phase relative to the voltage of said supply circuit connected with said element, of means for causing the discharge of energy stored within said energy storage means by way of said valve means comprising a source of alternating control potential of a phase different from the phase of the first said control potential connected with said element, and means for rendering ineffective the first said control potential and for rendering effective the second said control potential.

26. In an electric valve protective system, the combination with an electric current supply circuit, an electric current load circuit having energy storage means included therein, electric valve means interconnecting said circuits for the transfer of energy therebetween, and means for controlling the transfer of energy from said supply circuit to said load circuit by way of said valve means comprising a control element of said valve means and a source of alternating control potential of one phase relative to the voltage of said supply circuit connected with said element, of means for causing the discharge of energy stored within said energy storage means by way of said valve means comprising a source of alternating control potential of a phase different from the phase of the first said control potential connected with said element, and static means only for rendering ineffective the first said control potential and for rendering effective the second said control potential.

HAROLD WINOGRAD.